Oct. 22, 1963  W. R. SCOTT, JR  3,108,242
CORROSION DETECTING PROBE
Filed Aug. 23, 1961
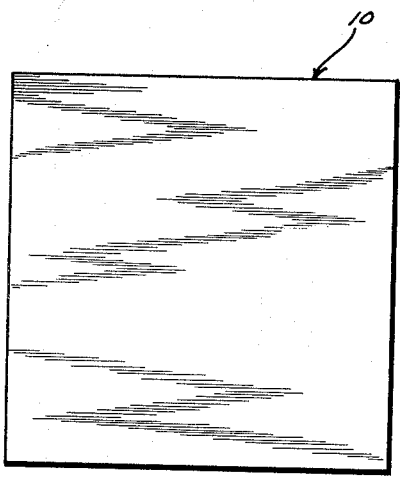
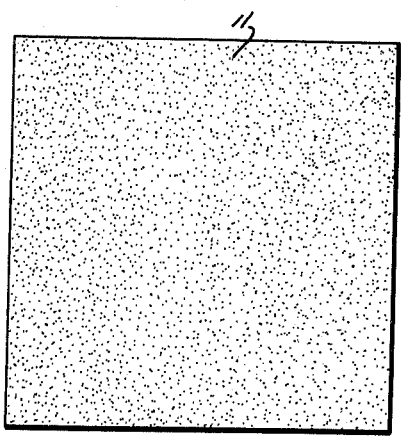
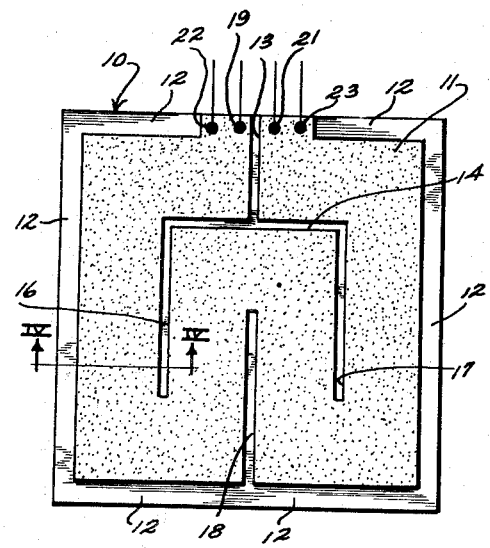
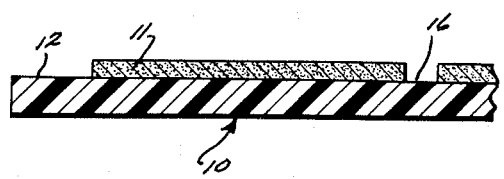
INVENTOR.
WILLARD R. SCOTT JR.
BY
ATTORNEYS

3,108,242
CORROSION DETECTING PROBE
Willard R. Scott, Jr., Fullerton, Calif., assignor to Magna Products Incorporated, Santa Fe Springs, Calif., a corporation of California
Filed Aug. 23, 1961, Ser. No. 133,405
5 Claims. (Cl. 338—13)

The present invention relates to improved corrosion detecting probes of the type employed for continuously detecting and measuring the amount of corrosion in a particular environment.

One of the most accurate means presently employed for detecting and measuring corrosion relies upon the change in electrical resistance which occurs when the cross-sectional area of a metallic probe decreases due to corrosive effects. This change in cross-sectional area, and hence the progress of corrosion, is detected by employing the corroding probe as one element of an electrical bridge circuit, usually of the Kelvin type. In order to compensate for the effects of temperature variations in the system, another arm of the bridge circuit consists of a reference probe having the same variation of electrical resistance to temperature as the corroding probe, but being protected against the corroding effect of the environment, usually by means of a protective coating. Thus, when the probe and the reference element are included in the system under test the ratio of the resistances of the two elements will vary solely by the extent of corrosion on the corroding probe, and will be independent of the temperature variations which affect both elements equally.

In some fields of corrosion testing, it is desirable to provide a relatively large area subject to corrosive attack in the probe. One such field is the evaluation of paints and protective coatings.

The measurement of corrosion in environments such as cooling water and marine atmospheres which produce a localized form of corrosion makes desirable the use of a probe of a rather extended area. Because of the inherently random nature of pitting attack, the probability that a specimen will experience corrosion representative of the extended area of actual systems decreases rapidly as the area of the test specimen decreases. For example, if the average number of pits occuring in a process vessel during a given time is 10 per square foot, a specimen 1 square foot in area would have a 90% chance of picking up one or more pits in a test, whereas a specimen 15 square inches in area would have only a 50 to 60% chance of experiencing one or more pits, and a specimen 8 square inches in area would have only a 30 to 40% chance. In the latter case, only one specimen out of three would show any corrosion at all on the average, and the result could be highly misleading. In this connection, it should be noted that probes presently in use have an exposed area of one-half square inch or less, and a length to width ratio on the order of twenty to one.

Thus, it is advisable for environments where corrosion occurs mainly by localized attack to use as large an area as possible. The two dimensions parallel to the metal surface may be expanded in a number of ways, and the final shape may be different for different applications. A number of considerations tend to limit the ratio of maximum to minimum dimensions of a test specimen. These include conductivity of the medium, flow patterns along the test surface, rigidity and handleability of the assembly, and geometry of the expected corrosion pattern. The net effect of all these is to indicate a test surface having a ratio of length to width as close as possible to unity, and a square configuration is generally the most convenient to use.

However, the use of a sensing element in the form of a square presents several additional problems. First, if the dimensions are more than a fraction of an inch, it is difficult to obtain uniform distribution of current across the sample, that is, in the direction transverse to the direction of current flow without resorting to large and cumbersome bus bars and associated equipment. Such uniform current distribution is necessary in order that each point on the surface may contribute equally to the resistance measurement. Another problem is presented by the fact that for a given area and thickness of metal in the specimen, the square configuration requires the greatest amount of current to produce whatever minimum voltage may be necessary to make the resistance measurement. This current is independent of the size of the square, and is proportional to the thickness of the metal.

Another problem arises in a relatively wide specimen because when corrosive attack is localized, the effect on electrical resistance depends largely on what fraction of the width of the current path is occupied by the metal lost. If the fraction is small, the electrical resistance of the specimen as a whole responds less than expected because the current tends to flow around the pits. If, on the other hand, the attack occupies a large fraction of the width, electrical resistance btcomes very sensitive to pitting. Thus, the sensitivity to localized attack may be adjusted by selection of the size of the specimen, if the size of the pit to be expected is known. Hence, as the overall dimensions of the sensing element are increased, the sensitivity to pits of any fixed size decreases. Accordingly, it is desirable to be able to restore this sensitivity to any desired extent.

One of the objects of the present invention is to provide a corrosion detecting probe which meets the requirements set forth in the foregoing discussion.

Another object of the present invention is to provide an improved corrosion detecting probe which provides a relatively long current conducting path for a given area of probe.

A further object of the invention is to provide a method for making probes having relatively large areas and at the same time having any desired sensitivity to localized attack.

In essence, the corrosion detecting probe of the present invention includes an electrically non-conductive base, and an electrically conductive, corrodible metal layer on the base, the metal layer appearing in the form of a pattern by which the metal layer is sub-divided into a current transmitting path of substantially longer extent than the longest physical dimension of the layer. In the preferred form of the present invention, the width of the current conducting path varies by not more than a factor of two along its length.

While the improved corrosion detecting probes of the present invention may take numerous geometric forms, my particularly preferred form is illustrated in the drawings in which:

FIGURE 1 is a plan view of a substrate or base used in the probe of the present invention;

FIGURE 2 is a plan view of the substrate after the application of a thin metal layer thereto;

FIGURE 3 is a view of the completed probe assembly illustrating the manner in which selected areas of the metal layer have been relieved to expose the underlying base; and FIGURE 4 is a greatly enlarged, fragmentary cross-sectional view taken substantially along the line IV—IV of FIGURE 3.

As shown in the drawings:

In FIGURE 1, reference numeral 10 indicates generally a relatively rigid base of an electrically non-conductive material. The base may be composed of any of a wide variety of materials including glass, ceramics, or electrically non-conductive synthetic resinous materials such as vinyl resins, acrylate resins, epoxy resins, phenol-formaldehyde resins, melamine resins, or the like. The initial step in the manufacture of the probe consists in applying to the base 10 a layer 11 of a corrodible, electrically conductive metal. Depending upon the environment to which the probe is to be exposed, the metal may be iron, zinc, or other corrodible metal. A convenient means for applying the layer 11 to the base 10 consists in cementing a thin foil of corrodible metal having a thickness on the order of 0.001 to 0.080 inch onto the base 10 and securing it thereto by means of the application of heat and pressure. Other means, however, can be employed for bonding the metal layer 11 to the base 10.

After the application of the layer 11, selected areas of the metallic layer 11 are relieved by suitable techniques such as etching, sandblasting (where the thickness of the metal permits) or the like. In the particular pattern illustrated in FIGURE 3, the metallic layer 11 has been relieved along a substantial portion of the periphery of the base 10, leaving a margin 12 in which the underlying base 10 is exposed. This type of pattern is particularly suitable for the testing of paint and coating materials in as much as it permits the paint to lap over the ends of the metallic pattern and eliminate any edge effect which might otherwise occur.

The metallic layer 11 is also relieved along a groove 13 which will be referred to as a longitudinal groove for purposes of orientation. At the base of the longitudinal groove 13 there is provided a transverse groove 14 which, at its opposed ends, connects with a pair of longitudinally extending, parallel grooves 16 and 17. Disposed between the grooves 16 and 17 is another longitudinally extending groove 18, equidistant between the two.

As indicated in FIGURE 3, the metallic layer 11 is provided with electrical taps, a pair of each taps existing on opposite sides of the groove 13. Taps 19 and 21 may be used as current supplying taps, and taps 22 and 23 may be used as potential taps for incorporating the electrical resistance of the sensing element into a resistance measuring circuit of the Kelvin bridge type.

It will be seen from FIGURE 3 that the path of current flow from the tap 19 to the tap 21 has a width which is very substantially less than the width of the original metallic layer 11, and that the width of the path is substantially uniform throughout its length. It will also be noted that the length of the electrically conductive path provided by the system of grooves therein is very substantially longer than the longest physical dimension of the metal layer 11 originally. Thus, if a small pit should occur in any given area of the current conducting path, its presence will be much easier to detect because it occupies a relatively larger percentage of the cross-sectional dimensions of the current path than it would if the pit had appeared in the original metal layer 11.

Dividing the area of the probe in the manner illustrated in FIGURE 3 does not materially change any interaction of one part of the total area with another, in as much as the resistance in the metal from any point to any other is only slightly greater than on the original, uncut surface. Furthermore, the relatively narrow current path reduces requirements for energizing current sharply. While the drawings illustrate one geometric pattern which may be employed, it will be apparent that the geometry can be varied substantially for any given probe while still securing the advantages noted previously.

Temperature compensation can also be provided in probes of this type by providing another probe of the same construction as that shown in FIGURE 3, but protecting the metal against corrosion by applying a protective coating such as an epoxy resin. Alternatively, the temperature cooperation may be accomplished by including a protected reference leg on the same substrate as the corroding pattern, the resistance of the corroding pattern and the reference leg being substantially equal. Then, when the corroding probe and this reference probe are included as two arms of an electrical resistance measuring bridge circuit, the ratio of resistances measured by the bridge will truly reflect the change in resistance attributable to the corrosion effects independent of temperature variations.

The probes of the present invention are particularly adaptable to testing paints and coating materials. It is merely necessary to apply the material to be tested over the probe in a relatively uniform film. If the protective film becomes defective, corrosion will commence on the corroding metal layer, and the progress of that corrosion can be continuously monitored by the electrical resistance measurements.

It will be evident that various modifications can be made to the described embodiments without departing from the scope of the present invention.

I claim as my invention:

1. A corrosion detecting probe comprising an electrically non-conductive base, an electrically conductive, exposed corrodible metal layer on said base occupying a major portion of the surface of said base, and means subdividing said metal layer into a current transmitting path of substantially longer extent than the longest physical dimension of said layer, the width of said path varying by not more than a factor of two along its length, and a tap at each end of said path for supplying electrical current thereto.

2. A corrosion detecting probe comprising a generally rectangular electrically non-conductive base, an electrically conductive, exposed corrodible metal layer on said base occupying a major portion of the surface of said base, said layer being relieved to expose the underlying base in spaced areas thereof, the relieved areas subdividing said layer into a current transmitting path of substantially longer extent than the longest physical dimension of said layer, and a tap at each end of said path for supplying electrical current thereto.

3. A corrosion detecting probe comprising an electrically non-conductive base, an electrically conductive exposed corrodible metal layer of a thickness in the range from 0.001 inch to 0.080 inch on said base occupying a major portion of the surface of said base, said layer being relieved to expose the underlying base in spaced areas thereof, the relieved areas subdividing said layer into a current transmitting path of substantially longer extent than the longest physical dimension of said layer, and a tap at each end of said path for supplying electrical current thereto.

4. A corrosion detecting probe comprising an electrically non-conductive base, an electrically conductive exposed corrodible metal layer on said base, said layer being relieved to expose the underlying base along at least a substantial portion of the periphery of said base, said layer also being relieved centrally of said layer, the relieved areas subdividing said layer into a current transmitting path of substantially longer extent than the longest physical dimension of said layer the area of said current transmitting path being very substantially greater than the total area of said relieved areas, and a tap at each end of said path for supplying electrical current thereto.

5. A corrosion detecting probe comprising an electrically non-conductive base, an electrically conductive, exposed corrodible metal layer on said base, said corrodible metal layer being divided into a pattern having a current transmitting path which is substantially larger than the largest dimension of said base, said path being substantially uniform in width along its length, an electrical connector at one end of said path, and an electrical connector at the other end of said path.

References Cited in the file of this patent

UNITED STATES PATENTS

| | | |
|---|---|---|
| 2,432,800 | Reichold | Dec. 16, 1947 |
| 2,735,754 | Dravnicks | Feb. 21, 1956 |

FOREIGN PATENTS

| | | |
|---|---|---|
| 389,438 | Great Britain | June 8, 1931 |